United States Patent
Crothers

(10) Patent No.: US 11,504,851 B2
(45) Date of Patent: Nov. 22, 2022

(54) SIMULATING PROCESS FORCES DURING ROBOT TESTING

(71) Applicant: The Boeing Company, Chicago, IL (US)

(72) Inventor: Phillip J. Crothers, Port Melbourne (AU)

(73) Assignee: The Boeing Company, Chicago, IL (US)

( * ) Notice: Subject to any disclaimer, the term of this patent is extended or adjusted under 35 U.S.C. 154(b) by 1130 days.

(21) Appl. No.: 15/999,632

(22) Filed: Aug. 20, 2018

(65) Prior Publication Data

US 2020/0055190 A1    Feb. 20, 2020

(51) Int. Cl.
*B25J 9/16* (2006.01)
*B25J 13/08* (2006.01)
*B25J 19/00* (2006.01)

(52) U.S. Cl.
CPC .......... *B25J 9/1671* (2013.01); *B25J 9/161* (2013.01); *B25J 13/085* (2013.01); *B25J 13/088* (2013.01); *B25J 19/0095* (2013.01)

(58) Field of Classification Search
CPC ........ B25J 9/1671; B25J 9/161; B25J 13/085; B25J 13/088; B25J 19/0095; B25J 9/009; B25J 9/1682
See application file for complete search history.

(56) References Cited

U.S. PATENT DOCUMENTS

| 5,798,627 A * | 8/1998 | Gilliland | 318/568.14 |
| 2009/0132088 A1 * | 5/2009 | Taitier | G05B 19/42 700/264 |
| 2013/0079928 A1 * | 3/2013 | Soe-Knudsen | B25J 9/163 700/254 |

OTHER PUBLICATIONS

Robotics Industry Insights, "Aerospace Manufacturing on Board with Robots", ria Robotic Industries Association, Robotics Online, Feb. 18, 2016, 20 pages [online], [retrieved on Aug. 20, 2018]. Retrieved from the Internet URL:https://www.robotics.org/content-detail.cfm/Industrial-Robotics-Industry-Insights/Aerospace-Manufacturing-on-Board-with-Robots/content_id/5960>.

* cited by examiner

*Primary Examiner* — Adam R Mott
*Assistant Examiner* — Elizabeth Rose Neleski
(74) *Attorney, Agent, or Firm* — Haynes and Boone, LLP

(57) ABSTRACT

Methods and systems according to one or more examples are provided for testing an automated platform, such as a robot. In one example, a system comprises a first robot configured to perform one or more processing operations on a workpiece. The system further comprises a second robot configured to simulate one or more parameters of the workpiece and an associated processing operation to provide one or more test conditions corresponding to each of the one or more processing operations the first robot would perform on the workpiece to test the first robot.

20 Claims, 6 Drawing Sheets

SIMULATING PROCESS FORCES DURING ROBOT TESTING

TECHNICAL FIELD

The present disclosure relates generally to testing automated platforms and more specifically to improved techniques for simulating parameters of a workpiece during robot testing.

BACKGROUND

Robots perform many processing operations, such as for example, in the manufacture of products. Prior to the start of such operations, robots may undergo verification testing by performing the actual operations on test products in a laboratory or production test environment. Unfortunately, this approach can be costly and time consuming.

Accordingly, there is a need for improved systems, apparatus, and related methods to efficiently and effectively test robots to verify they can perform processing operations associated with the manufacture of products.

SUMMARY

Methods and systems are disclosed herein that provide improved techniques for testing an automated platform, such as a robot. In some examples, a first robot is tested by using a second robot to simulate parameters resulting from working on a workpiece and one or more simulated processing operations performed on the workpiece. These workpiece parameters are simulated by one or more forces exerted on the first robot by the second robot responsive to one or more processing operations the first robot would perform on the workpiece.

In one example, a system includes a first robot configured to perform one or more processing operations on a workpiece; and a second robot configured to simulate one or more parameters of the workpiece and an associated processing operation to provide one or more test conditions corresponding to each of the one or more processing operations the first robot would perform on the workpiece to test the first robot.

In another example, a method includes operating a first robot to perform one or more processing operations the first robot would perform on a workpiece; and simulating, by a second robot, one or more parameters of the workpiece and an associated processing operation to provide one or more test conditions corresponding to each of the one or more processing operations the first robot would perform on the workpiece to test the first robot.

The scope of the disclosure is defined by the claims, which are incorporated into this section by reference. A more complete understanding of examples of the disclosure will be afforded to those skilled in the art, as well as a realization of additional advantages thereof, by a consideration of the following detailed description of one or more examples. Reference will be made to the appended sheets of drawings that will first be described briefly.

BRIEF DESCRIPTION OF THE DRAWINGS

Examples of the present disclosure and their advantages are best understood by referring to the detailed description that follows. It should be appreciated that like reference numerals are used to identify like elements illustrated in one or more of the figures.

DETAILED DESCRIPTION

Robots perform many processing operations in the manufacture of products. Prior to start of such operations robots undergo testing to verify their ability to perform the processing operations. Conventional techniques used in testing a robot may include performing the actual operations on test products in a laboratory test environment. For example, testing a robot's ability to perform a trimming operation may involve fitting the robot with a spindle system and cutters, and fabricating coupons of the material to be cut and fixtures to support the coupons, all to support actual cutting of the test coupons. Unfortunately, this approach can be of only limited use as this conventional implementation is both costly and time consuming.

Various examples of the present disclosure provide for improved approaches to testing a robot to verify the robot's ability to perform one or more processing operations on a workpiece. In some examples, processing operations include cutting, drilling, fastening, sealing, painting and/or welding of materials, such as composite materials, for example. Simulated processing operations may be performed on other workpiece materials, such as aluminum alloy, titanium, carbon and/or glass fiber materials, and/or any other desired workpiece material, for example. To test the first robot, a second robot is used to simulate parameters of the workpiece to provide test conditions corresponding to each of the one or more processing operations the first robot would perform on the workpiece. In some examples, parameters of the workpiece comprise properties of the workpiece including a material composition, a size, a weight, a density, a hardness, one or more surface contours, and/or other properties of the workpiece, as appropriate.

Figure 1:
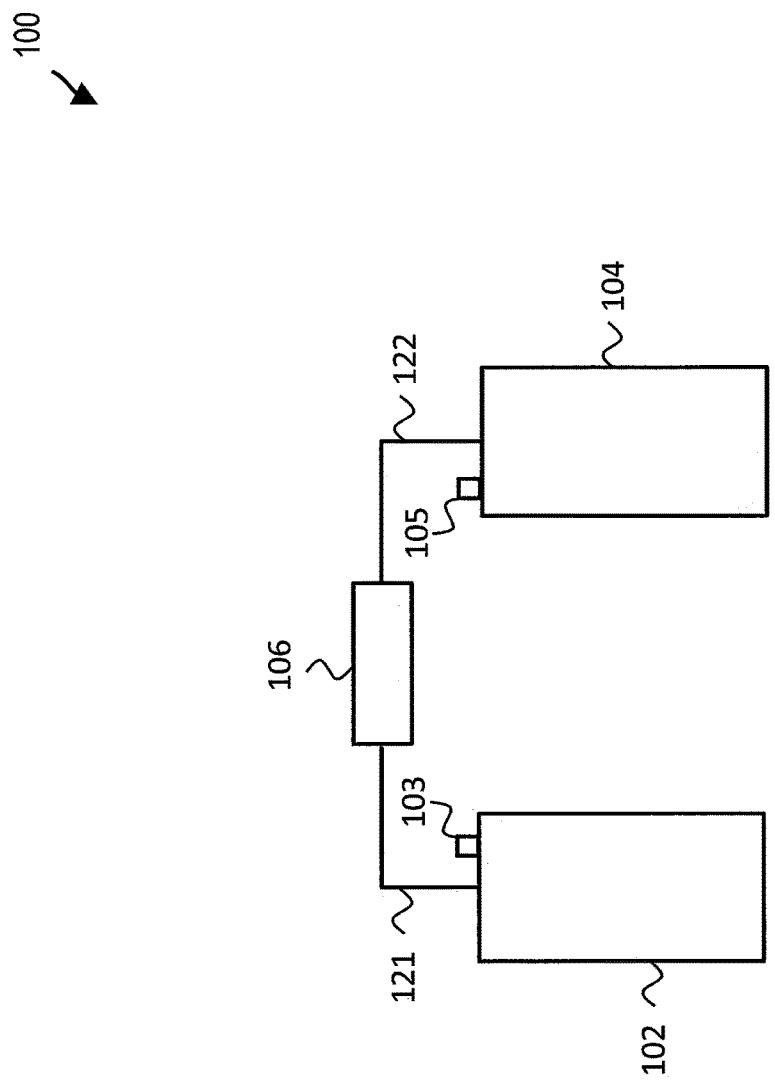
FIG. 1 illustrates a robot test system in accordance with an example of the disclosure.

FIG. 1 illustrates a robot test system 100 in accordance with an example of the disclosure. As shown in FIG. 1, robot test system 100 includes a first robot 102, a second robot 104, and a test load 106. Robot test system 100 may be used to test first robot 102 in accordance with various techniques described herein. Robot test system 100 may be used to test a variety of robots, such as in one non-limiting example, a robot that performs processing operations on a fuselage and/or a wing of an aircraft. Robots performing other processing operations on other products may also be tested using robot test system 100.

As further discussed below, robot test system 100 may be configured to test first robot 102 to verify that first robot 102 can perform one or more processing operations on a workpiece. Second robot 104 coupled to first robot 102 via test load 106 provides for simulating one or more parameters of a workpiece and an associated processing operation. In this regard, second robot 104 is disposed adjacent to first robot 102 to impart simulated parameters of the workpiece. The parameters of the workpiece correspond to one or more forces generated by test load 106. Test load 106 may be coupled between first robot 102 and second robot 104 using tool center points secured to each robot, and/or any other appropriate coupling devices. In one example, test load 106 is coupled between first robot 102 and second robot 104 at a tool center point 121 (e.g., a first tool center point) of first robot 102 and a tool center point 122 (e.g., a second tool center point) of second robot 104. Second robot 104 selectively adjusts test load 106 to exert a force on first robot 102 that is substantially equivalent to one or more parameters of the workpiece.

First robot 102 may be implemented as any type of robot appropriate for performing processing operations, such as cutting, drilling, fastening, sealing, painting and/or welding, for example. First robot 102 may be implemented as a stationary articulated robot configured to perform one or more repetitive processing operations on a workpiece that is moved into a position near first robot 102. First robot 102 may be implemented as an automated manipulator robot or as a gantry robot, for example. First robot 102 may be implemented as a mobile robot secured to a mobile platform, a rail, and/or a track that provides for movement of first robot 102 to a location on a workpiece to perform one or more processing operations. Second robot 104 may be implemented as a stationary robot and/or a mobile robot similar to first robot 102, as discussed above.

Second robot 104 may be disposed adjacent to first robot 102. Second robot 104 may be disposed relative to first robot 102 to stress test load 106 to transfer a force to first robot 102. In one example, the force exerted on first robot 102 by second robot 104 is a force comprising a static magnitude. In this regard, second robot 104 is maintained in close proximity to first robot 102 at a fixed distance from first robot 102. In one non-limiting example, second robot 104 maintains a distance of approximately one-quarter inch from first robot 102. However, this distance may vary based on an identified magnitude of force to be exerted on first robot 102 by second robot 104, when first robot 102 and second robot 104 are coupled with a spring, for example. In another example, the force exerted on first robot 102 by second robot 104 is a dynamic force. In this regard, second robot 104 maintains a selective distance from first robot 102 to exert a selective magnitude of force on first robot 102. In another example, the force exerted on first robot 102 by second robot 104 is an impulse force characterized as a short duration change in magnitude of one or more forces exerted on first robot 102 by second robot 104 to simulate a sudden and short momentary change in one or more parameters of the workpiece and/or an associated processing operation.

First robot 102 and second robot 104 are configured to communicate with a user and/or other robots to communicate information and/or receive control signals. In one example, first robot 102 is configured to communicate with a user and/or second robot 104 through a communication port 103. In addition, second robot 104 is configured to communicate with a user and/or first robot 102 through a communication port 105. Communication ports 103 and 105 may be implemented as wired communication ports or wireless communication ports.

Figure 2:
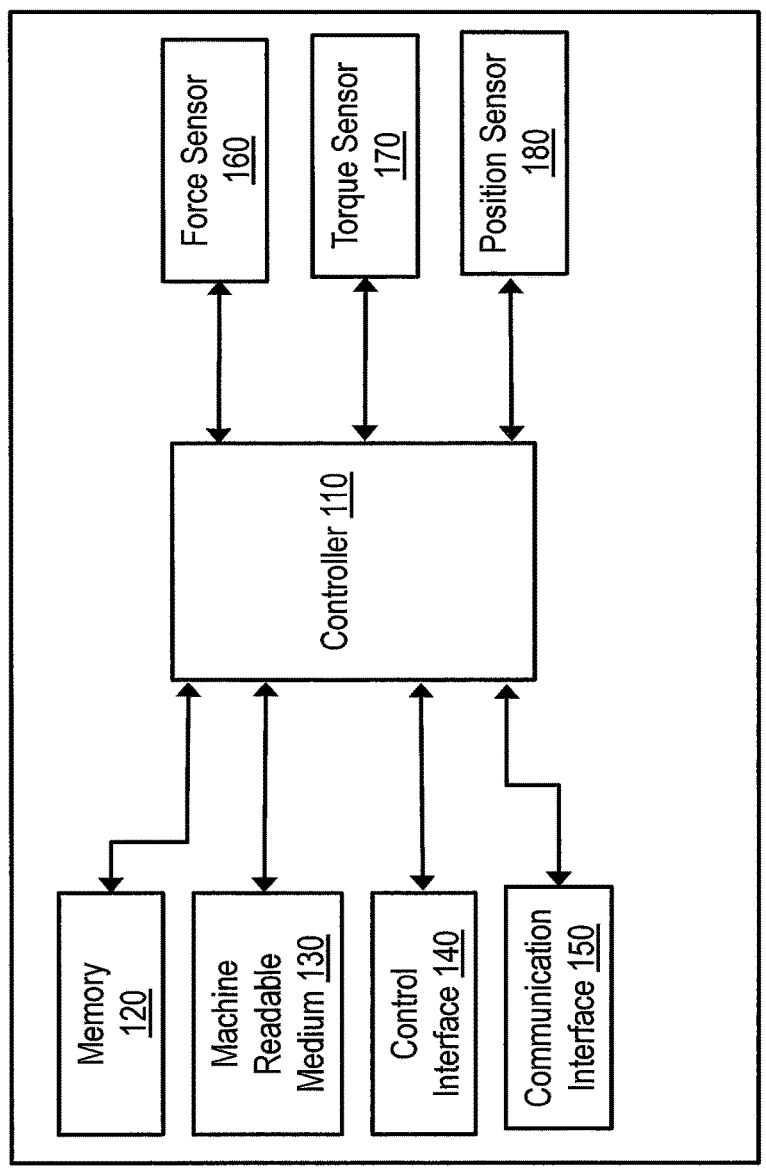
FIG. 2 illustrates a block diagram of a second robot of the robot test system of FIG. 1 in accordance with an example of the disclosure.

FIG. 2 illustrates a block diagram of a second robot 104 of the robot test system 100 of FIG. 1 in accordance with an example of the disclosure. In the example shown in FIG. 2, second robot 104 includes a controller 110, a memory 120, a machine readable medium 130, a control interface 140, a communication interface 150, a force sensor 160, a torque sensor 170, and a position sensor 180.

In various examples, second robot 104 may be implemented to test first robot 102. Second robot 104 may represent any type of robot, which, for example simulates parameters of the workpiece. In some examples, first robot 102 and second robot 104 are stationary robots located in close proximity to each other. In other examples, first robot 102 and second robot 104 are mobile robots. In this regard, second robot 104 is configured to closely follow first robot 102 as first robot 102 moves along a path that first robot 102 would move to perform one or more processing operations.

Controller 110 may include, for example, a microprocessor, a single-core processor, a multi-core processor, a microcontroller, a field programmable gate array (FPGA), a digital signal processing (DSP) device, one or more memories for storing executable instructions (e.g., software, firmware, or other instructions), and/or any other appropriate combination of processing device and/or memory to execute instructions to perform any of the various operations described herein. Controller 110 is adapted to interface and communicate with memory 120, machine readable medium 130, control interface 140, communication interface 150, force sensor 160, torque sensor 170, and position sensor 180, and/or other sensors appropriate to measures forces or movement of robots to perform method and processing steps as described herein. In some examples, controller 110 may be physically coupled to second robot 104. In other examples, controller 110 may be remotely located from second robot 104.

In various examples, it should be appreciated that processing operations and/or instructions may be integrated in software and/or hardware as part of controller 110, or code (e.g., software or configuration data) which may be stored in memory 120. Examples of processing operations and/or instructions disclosed herein may be stored by a machine readable medium 130 in a non-transitory manner (e.g., a memory, a hard drive, a compact disk, a digital video disk, or a flash memory) to be executed by a computer (e.g., logic or processor-based system) to perform various methods disclosed herein.

Memory 120 includes, in one example, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one example, controller 110 is adapted to execute software stored in memory 120 and/or machine readable medium 130 to perform various methods, processes, and operations in a manner as described herein.

Control interface 140 may include, in one example, a control panel unit (e.g., a wired or wireless control panel unit) having one or more user-activated mechanisms (e.g., buttons, knobs, sliders, or others) adapted to interface with a user and receive user input control signals. In various examples, it should be appreciated that the control panel unit may be adapted to include one or more other user-activated mechanisms to provide various other control operations of second robot 104, such as power on, stand-by, power off, robot movement control and/or various other features and/or parameters. For one or more examples as discussed further herein, control interface 140 may represent appropriate portions of a tablet, a laptop computer, a desktop computer, or other type of device to provide a control interface 140 implemented as a remote wireless control interface and/or a wired control interface. In this regard, control interface 140 communicates through communication port 105 implemented as a wireless or wired communication port.

Communication interface 150 may be implemented as an interface component adapted for communication with a user, first robot 102 and/or other devices in communication with second robot 104. In various examples, communication interface 150 may include one or more wired or wireless communication components, such as an Ethernet and/or RS-485 protocol connection, a wireless local area network (WLAN) component, a wireless broadband component, mobile cellular component, or various other types of wireless communication components including radio frequency (RF), microwave frequency (MWF), and/or infrared frequency (IRF) components adapted for communication with a user. As such, communication interface 150 may include communication port 105 coupled thereto for wireless and/or wired communications.

Force sensor 160 is configured to measure a force exerted on first robot 102 and provide force sensor measured data to controller 110. In various examples, force sensor 160 is implemented as a strain gauge, a capacitively coupled force sensor and/or other force sensor devices, as appropriate. Force sensor 160 can include integrated electronics to convert force sensor measured data to electrical signals that are communicated to controller 110 via communication interface 150.

Torque sensor 170 is configured to measure a torque exerted on first robot 102 by second robot 104 (e.g., via test load 106 coupled between first robot 102 and second robot 104) and provide torque sensor measured data to controller 110. In various examples, torque sensor 170 is implemented as a 6-axis force-torque sensor, and/or other torque sensor devices, as appropriate. In some examples, integrated electronics are included with torque sensor 170 to convert torque sensor measured data to electrical signals that are communicated to controller 110 via communication interface 150.

Position sensor 180 provides position sensor measured data of second robot 104 to controller 110 that is used to determine a position of second robot 104 as it travels along a path. In various examples, position sensor 180 may be implemented as a GPS based position sensor, a laser tracker, an encoder based position sensor, and/or other position sensor devices, as appropriate. Position sensor 180 can include integrated electronics to convert position sensor measured data to electrical signals that are communicated to controller 110 via communication interface 150.

In another example, position sensor 180 is coupled to first robot 102 to provide position sensor measured data of first robot 102. Position sensor measured data of first robot 102 may be converted to electrical signals that are communicated to controller 110 via communication interface 150. Position sensor measured data of first robot 102 may be analyzed by controller 110 (e.g., and provided to a user via communication interface 150) to determine a deviation of first robot 102 from a pre-determined path of travel caused by the force exerted on first robot 102, as discussed herein.

Figure 3B:
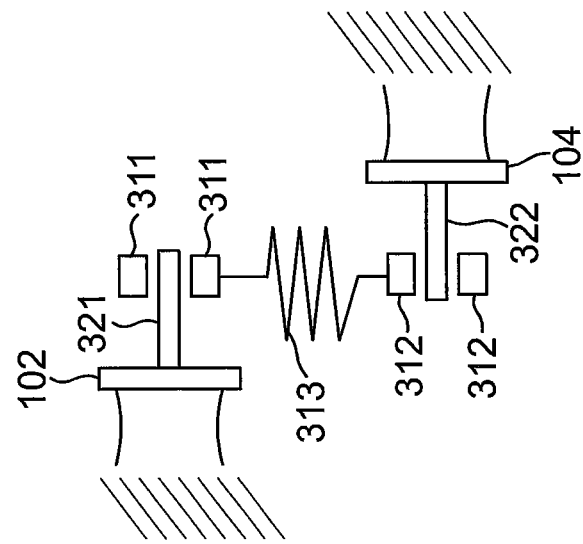
FIGS. 3A, 3B, and 4 illustrate test loads used in simulating workpiece parameters in accordance with examples of the disclosure.
Figure 3A:
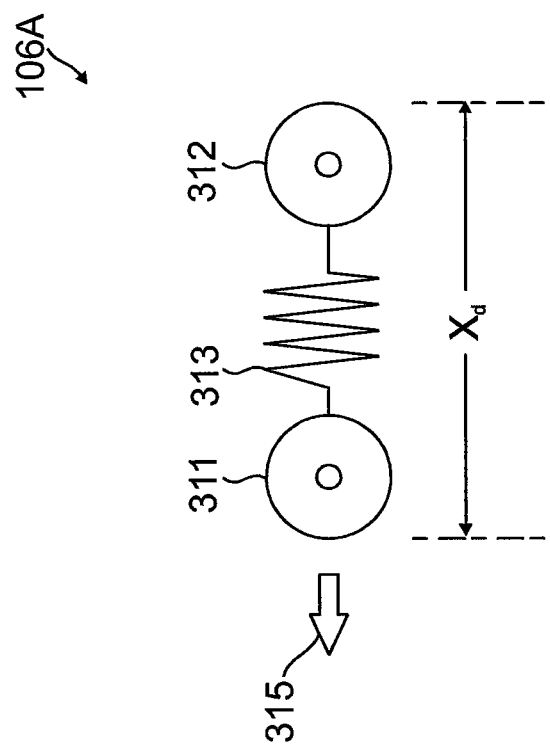

FIGS. 3A and 3B illustrate a test load 106A used in simulating workpiece parameters in accordance with examples of the disclosure. In the example shown in FIG. 3A, test load 106A (e.g., a first test load) is used to provide a force exerted on first robot 102. Test load 106A is implemented as a first bearing 311, a second bearing 312, and a spring 313.

First bearing 311 is connected to first robot 102 and second bearing 312 is connected to second robot 104. Spring 313 is connected between first bearing 311 and second bearing 312. Spring 313 is configured to exert a force on first robot 102 responsive to an extension of spring 313. Extension of spring 313 is controlled by second robot 104, where second robot 104 extends spring 313 a distance Xd in a direction 315 to exert a force on first robot 102. In various examples, second robot maintains a selective distance from first robot 102 to extend spring 313 a selective distance Xd to exert a magnitude of force on first robot 102. In some examples, movement of second robot 104 is delayed in time from movement of first robot 102 to extend spring 313.

In one example, controller 110 receives force sensor measured data from force sensor 160 and controls a movement of second robot 104 to maintain a fixed distance from first robot 102 (e.g., and maintain spring extension distance Xd) to maintain the force and/or transfer a load to first robot 102. In various examples, spring 313 provides for coupling that allows for minor differences in accuracy and timing of movements between first robot 102 and second robot 104. Spring 313 may be implemented as any type of spring that will exert a force when expanded and/or contracted, such as for example, a coil spring, a spiral spring, and/or other spring devices as appropriate. Spring 313 may be fabricated from a metallic, a composite and/or a rubber material, or any other spring material appropriate to provide a selectively adjustable force, for example. In some examples, a spherical bearing coupling is possible between first robot 102 and second robot 104 based on second robot 104 being controlled by a force and torque modification of its path and/or inertia.

As shown in FIG. 3B, first bearing 311 is connected to a first tool center point 321 of first robot 102. Second bearing 312 is connected to a second tool center point 322 of second robot 104. First bearing 311 and second bearing 312 rotate about first tool center point 321 and second tool center point 322, respectively. In this regard, spring 313 may freely rotate three hundred sixty degrees about first robot 102 and second robot 104 to maintain a longitudinal orientation between first robot 102 and second robot 104. In some examples, first bearing 311 and/or second bearing 312 is implemented as a spherical bearing. However, other appropriate implementations of first bearing 311 and/or second bearing 312 are possible in other examples. First bearing 311 and second bearing 312 may be implemented as any type of bearing that will enable rotational movement, such as for example, a ball bearing, a roller bearing, and/or other bearing devices, as appropriate. In this regard, first bearing 311 and second bearing 312 provides for rotational movement of spring 313 to prevent binding or other deleterious effects on spring 313 during robot motion.

Figure 4:
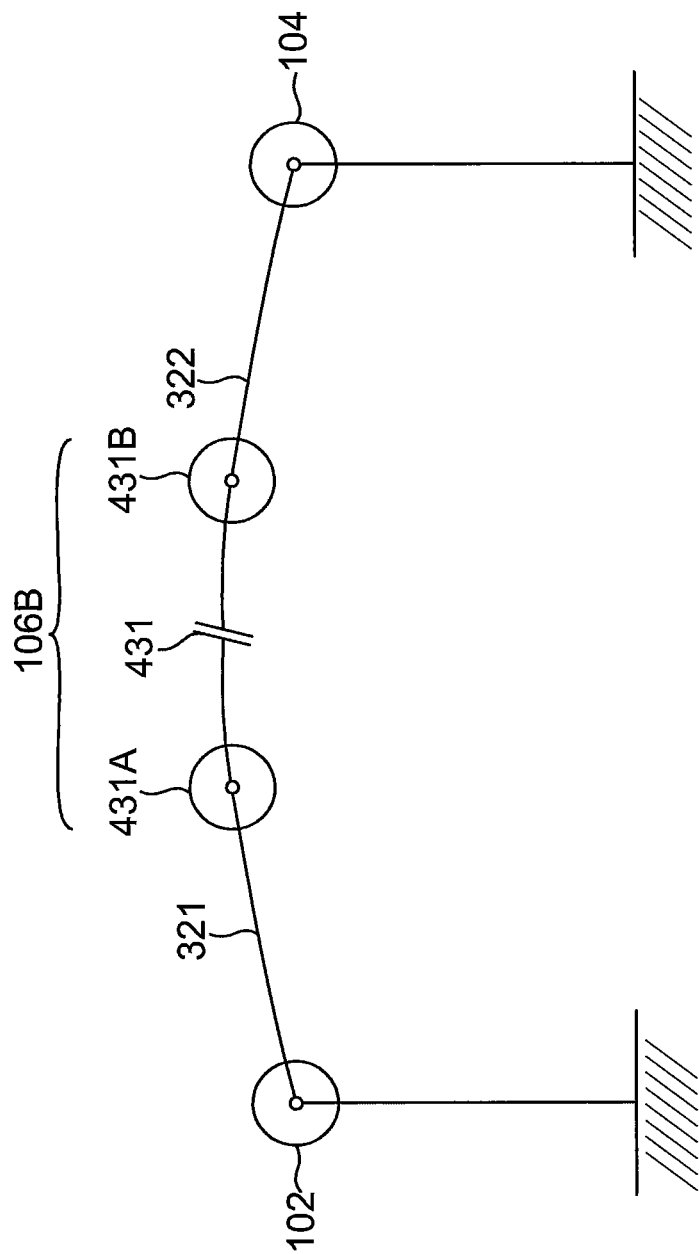

FIG. 4 illustrates a test load 106B used in simulating workpiece parameters in accordance with an example of the disclosure. In the example shown in FIG. 4, test load 106B (e.g., a second test load) is used to provide one or more forces exerted on first robot 102. Test load 106B is implemented as a sleeve 431 connected between first robot 102 and second robot 104. In this regard, a first end 431A of sleeve 431 is connected to first tool center point 321 of first robot 102 and a second end 431B of sleeve 431 is connected to second tool center point 322 of second robot 104. Sleeve 431 may be implemented as any type of sleeve material that will exert a force when expanded and/or contracted, such as for example, a rubber sleeve, and/or other appropriate elastic sleeve material to transfer a force and to allow for an inaccuracy of movement and/or timing between first robot 102 and second robot 104.

Test load 106B is configured to maintain a desired force vector on first robot 102 that simulates one or more processing operations and parameters of a workpiece 540 that first robot 102 would perform on the workpiece, as first robot 102 moves along a first path. In one example, controller 110 receives electrical signals corresponding to force sensor measured data from force sensor 160 and controls a movement of second robot 104 to maintain the desired force vector at any instant of motion on first robot 102. In this regard, second robot 104 may move in any direction relative to first robot 102, responsive to controller 110, to maintain the force vector on first robot 102.

Figure 5B:
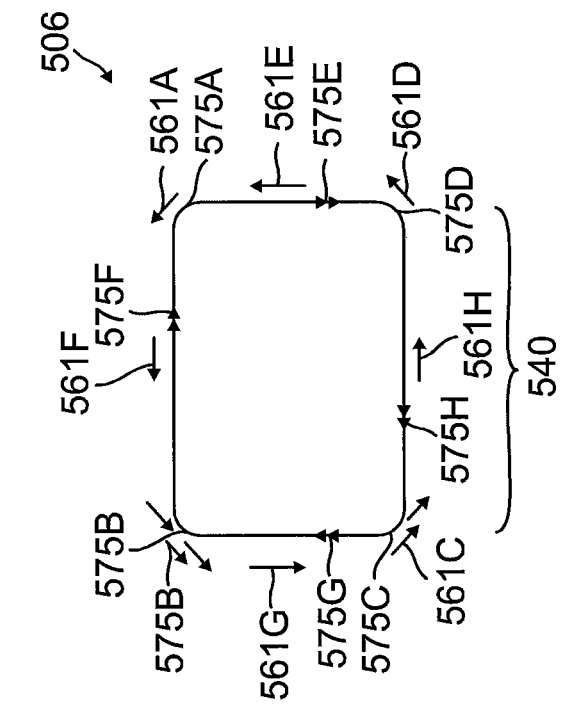
FIGS. 5A and 5B illustrate various forces exerted on a first robot in accordance with examples of the disclosure.
Figure 5A:
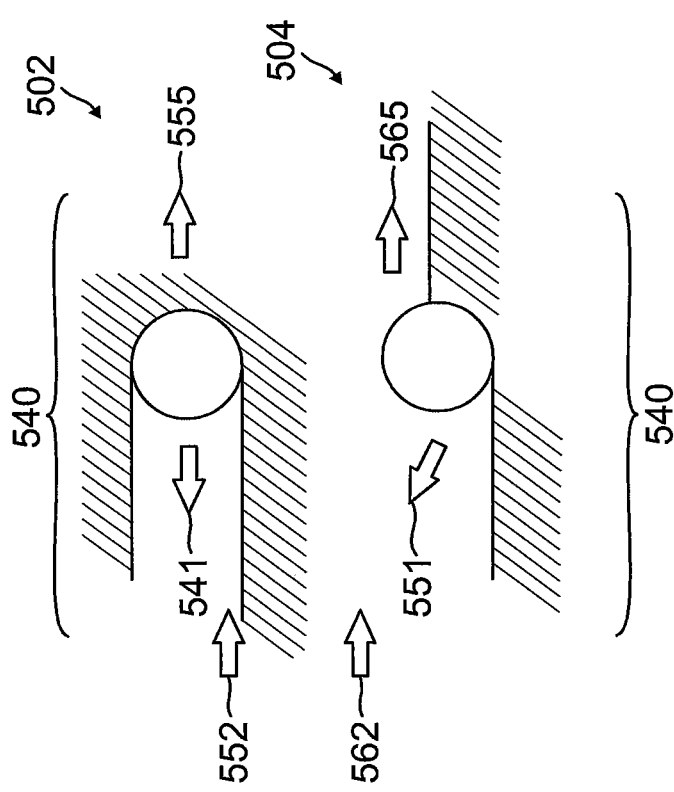

FIGS. 5A and 5B illustrate various forces exerted on a first robot 102 in accordance with examples of the disclosure. In the example shown in FIG. 5A, force 541 and 551 (e.g., simulated workpiece forces) are exerted on first robot 102 responsive to a cutting operation 502 and a cutting operation 504, respectively, that first robot 102 would perform on workpiece 540. In other examples, a force may be exerted on first robot 102 responsive to a drilling, welding, fastening, painting, and/or other processing operations that first robot 102 would perform on workpiece 540. As shown in FIG. 5A, cutting operation 502 illustrates force 541 exerted on first robot 102 by second robot 104 as first robot 102 travels along a path 555. As illustrated, force 541 is exerted on first robot by second robot 104 in a direction opposite of path 555 to simulate a cutting force and/or a force of resistance to motion, for example. In one example, force 541 is proportional to the speed of movement of first robot 102 traveling along path 555. In one example, force 541 may vary in direction and/or magnitude to simulate cutter conditions and/or workpiece conditions (e.g., a material thickness, material composition, and/or a method of holding the workpiece, for example). In this regard, dynamic forces and/or impulse forces may be used to simulate varying cutter conditions and/or varying workpiece conditions. In this example, second robot 104 moves along path 552 which is substantially similar to path 555 of first robot 102.

Cutting operation 504 illustrates force 551 exerted on first robot 102 by second robot 104 as first robot 102 travels along a path 565. As illustrated, force 551 is exerted on first robot by second robot 104 in a direction tangential to path 555, as first robot 102 would perform cutting operation 504 on workpiece 540 near a surface of workpiece 540. In this example, second robot 104 is offset from first robot 102 to exert force 551. Cutting operations 502 and/or 504 may be examples of a sharp cutting operation and/or a blunt cutting operation, and force 541 and/or force 551 exerted on first robot 102 by second robot 104 may be selectively adjusted to simulate parameters of workpiece 540 responsive to cutting operation 502 and/or cutting operation 504 that first robot 102 would perform on workpiece 540.

In some examples, force 541 and/or force 551 exerted on first robot 102 by second robot 104 are static forces (e.g., a fixed magnitude of force 541 and/or 551). In some examples, force 541 and/or force 551 exerted on first robot 102 by second robot 104 are dynamic forces. In this regard, as illustrated, a dynamic force may be exerted on first robot 102 while first robot 102 is moving along path 555 or path 565 (e.g., a first path), and second robot 104 is moving along path 552 or a path 562 (e.g., a second path). In various examples, force 541 and/or force 551 may momentarily change a magnitude of force to exert an impulse force for a short duration on first robot 102 by second robot 104. An impulse force may simulate a short and sudden momentary change in one or more properties of workpiece 540, such as, a size, a density, a hardness, and/or a surface contour of workpiece 540. These examples are non-limiting, and other examples of static forces, dynamic forces, and/or impulse forces are possible to simulate other properties of workpiece 540, as appropriate. In some examples, properties of workpiece 540 vibration and/or harmonics of vibration may be simulated, such as for example, a high frequency vibration response of workpiece 540 to various processing operations described herein.

In the example shown in FIG. 5B, force 561 (e.g., to simulate one or more parameters of workpiece 540) is exerted on first robot 102 responsive to a cutting operation 506 that first robot 102 would perform on workpiece 540. Cutting operation 506 illustrates force 561 exerted on first robot 102 by second robot 104 as first robot 102 travels along a path 575. In this example, path 575 is rectangular in shape including rounded corners 575A-D. In this regard, forces 561A-D are exerted on first robot 102 by second robot 104 in a direction tangential to path 575 as first robot 102 would perform cutting operation 506 on workpiece 540 at rounded path segments 575A-D. In addition, forces 561E-H are exerted on first robot 102 by second robot 104 in a direction opposite to path 575 as first robot 102 would perform cutting operation 506 on workpiece 540 at straight path segments 575E-H. In various examples, forces 561 A-H may be dynamic in direction, time duration, and/or magnitude relative to first robot 102 motion path, to simulate parameters of workpiece 540 responsive to cutting operation 506 and/or other processing operations, as appropriate.

Advantageously, robot test system 100 is capable of simulating multiple parameters of workpiece 540 to test first robot 102. In this regard, robot test system 100 provides for a robust robot test approach by simulating multiple parameters of workpiece 540 to provide multiple test conditions corresponding to each of the processing operations that first robot 102 would perform on workpiece 540. For example, a first parameter comprising a property of workpiece 540 (e.g. a first workpiece) can correspond to a material composition of workpiece 540 and a force exerted on first robot 102 by second robot 104 would correspond to the material composition. A second parameter comprising a property of workpiece 540 (e.g. a second workpiece) can correspond to a density of workpiece 540 and a force exerted on first robot 102 by second robot 104 would correspond to the density. Further, for example, a third parameter comprising a property of workpiece 540 (e.g. a third workpiece) can correspond to a surface contour of workpiece 540 and a force exerted on first robot 102 by second robot 104 would correspond to the surface contour. Thus, robot test system 100 provides for flexibility in simulating parameters of one or more workpieces 540 to provide a significant cost and time savings benefit to test first robot 102.

Figure 6:
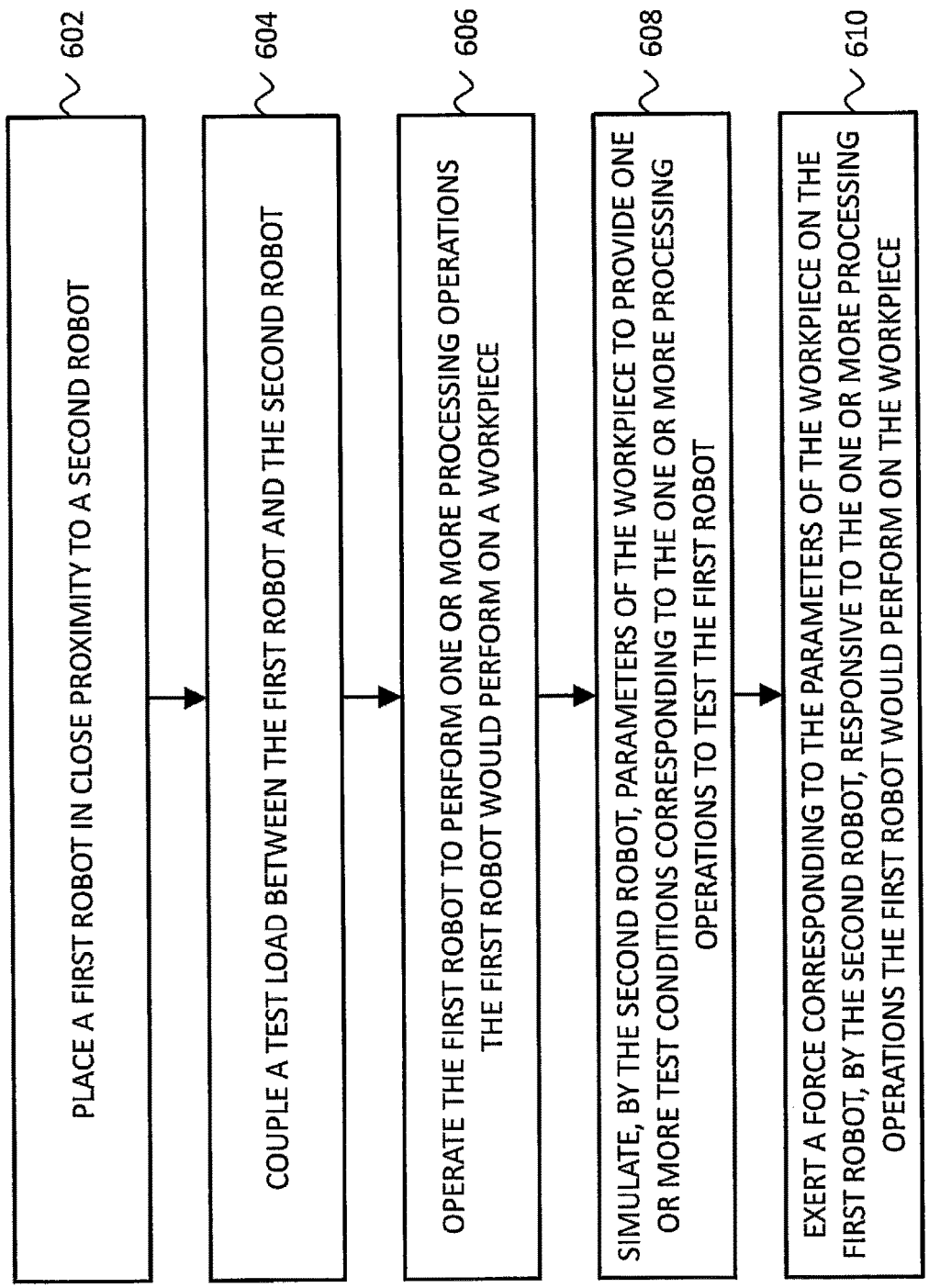
FIG. 6 illustrates a process for using a robot test system in accordance with an example of the disclosure.

FIG. 6 illustrates a process for using a robot test system 100 in accordance with an example of the disclosure. The process may begin in block 602 by placing a first robot 102 in close proximity to a second robot 104.

In block 604, a test load 106 is coupled between first robot 102 and second robot 104. In one example, test load 106A is implemented as a spring 313 connected between first robot 102 and second robot 104. In another example, test load 106B is implemented as a sleeve 431 connected between first robot 102 and second robot 104. In various examples, test load 106 is implemented as a flexible material to provide for coupling that allows for minor differences in accuracy and timing of movements between first robot 102 and second robot 104.

In block 606, robot test system 100 operates first robot 102 to perform one or more processing operations that first robot 102 would perform on a workpiece 540.

In block 608, parameters of workpiece 540 are simulated by second robot 104 to provide one or more test conditions corresponding to each of one or more processing operations that first robot 102 would perform on workpiece 540 to test first robot 102.

In some examples, second robot 104 simulates multiple parameters of each of multiple workpieces to provide one or more test conditions corresponding to each of one or more processing operations that first robot 102 would perform, and each one of the multiple parameters corresponds to a different one of the multiple workpieces.

In block 610, second robot 104 exerts a force on first robot 102 corresponding to one or more of the parameters of workpiece 540. The force exerted on first robot 102 is responsive to the one or more processing operations that first robot 102 would perform. In one example, a first force is responsive to a cutting operation. In another example, a second force is responsive to a drilling operation. In various examples, one or more forces are responsive to other processing operations, such as a painting, a fastening, and/or a welding operation.

In one example, test load 106A is coupled between first robot 102 and second robot 104 to provide a force exerted on first robot 102. Second robot extends spring 313 of test load 160A and maintains a selective distance from first robot 102 to extend spring 313 to select a magnitude of force exerted on first robot 102.

In another example, a constant directional force is exerted on first robot 102 by second robot 104. Test load 160B is coupled between first robot 102 and second robot 104 to provide the constant directional force. A force sensor 160 coupled to second robot 104 provides controller 110 with electrical signals corresponding to force sensor measured data. Controller 110 adaptively programs a direction of travel of second robot 104 to maintain the constant directional force responsive to the force sensor measured data.

In view of the present disclosure, it will be appreciated that a robot test system implemented in accordance with various examples set forth herein may provide for simulated parameters of a workpiece to provide one or more test conditions corresponding to one or more processing operations that first robot would perform on a workpiece. The robot test system incorporates second robot and test load to provide the simulated parameters of the workpiece. Robot test system provides for an adaptive and dynamic test system by simulating parameters of processing operations and multiple workpieces under multiple test conditions to test first robot, all to optimize testability without the need for implementing a special subsystem test laboratory and fabricating test products that add schedule time and cost to test first robot's ability to perform processing operations first robot would perform on the workpiece.

Where applicable, various examples provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Examples described above illustrate but do not limit the disclosure. It should also be understood that numerous modifications and variations are possible in accordance with the principles of the present disclosure. Accordingly, the scope of the disclosure is defined only by the following claims.

What is claimed is:

1. A system comprising:
a first robot configured to perform one or more processing operations on a workpiece; and
a second robot configured to simulate one or more parameters of the workpiece and an associated processing operation to provide one or more test conditions corresponding to each of the one or more processing operations the first robot would perform on the workpiece to test the first robot;
wherein the one or more parameters of the workpiece correspond to one or more forces exerted on the first robot by the second robot responsive to the one or more processing operations the first robot would perform on the workpiece.

2. The system of claim 1, wherein the one or more parameters of the workpiece comprise properties of the workpiece, and wherein the properties of the workpiece comprise a material composition, a size, a weight, a density, a hardness, and/or one or more surface contours.

3. The system of claim 1, the one or more forces comprising:
a first force exerted on the first robot responsive to a cutting operation; and/or
a second force exerted on the first robot responsive to a drilling operation.

4. The system of claim 3, wherein the one or more forces further comprises a static force, a dynamic force, and/or an impulse force, and wherein the impulse force comprises a short duration change in at least one of the one or more forces to simulate a momentary change in the one or more parameters of the workpiece and/or the associated processing operation.

5. The system of claim 1, further comprises a test load comprising a first bearing, a second bearing, and a spring configured to generate the one or more forces, and wherein:
the first bearing is coupled to the first robot;
the second bearing is coupled to the second robot; and
the spring is coupled between the first bearing and the second bearing, and wherein the spring is configured to extend to exert the one or more forces on the first robot.

6. The system of claim 5, wherein the second robot is configured to substantially maintain a selective distance from the first robot to extend the spring and provide a selective magnitude of the one or more forces on the first robot, and wherein the test load is configured to maintain at least one of the one or more forces on the first robot.

7. The system of claim 5, wherein the test load is a first test load, the system further comprises a second test load comprising a sleeve coupled between the first robot and the second robot, wherein the second test load is configured to exert a force vector on the first robot, wherein the second robot further comprises a force sensor configured to provide force sensor measured data associated with the force vector.

8. The system of claim 7, wherein the second robot further comprises a controller configured to receive the force sensor measured data, and adaptively program a direction of travel of the second robot to maintain the force vector responsive to the force sensor measured data.

9. The system of claim 1, wherein:
the first robot is configured to move along a first path; and
the second robot is configured to move along a second path, wherein the second path is substantially similar to the first path.

10. A method of using the system of claim 1, the method comprising:
operating the first robot to perform the one or more processing operations; and
simulating, by the second robot, the one or more parameters of the workpiece and the associated processing operation to provide the one or more test conditions corresponding to each of the one or more processing operations the first robot would perform on the workpiece to test the first robot.

11. The method of claim 10, the method further comprising:
traveling, by the first robot, along a first path;
traveling, by the second robot, along a second path that is substantially similar to the first path; and
simulating, by the second robot, a plurality of parameters associated with a plurality of workpieces and a plurality of associated processing operations to provide one or more test conditions corresponding to each of the plurality of processing operations the first robot would perform on the plurality of workpieces to test the first robot, wherein at least one of the plurality of parameters is associated with a different one of the plurality of workpieces and/or the plurality of associated processing operations.

12. A method comprising:
operating a first robot to perform one or more processing operations the first robot would perform on a workpiece; and
simulating, by a second robot, one or more parameters of the workpiece and an associated processing operation to provide one or more test conditions corresponding to each of the one or more processing operations the first robot would perform on the workpiece to test the first robot;
wherein the one or more parameters of the workpiece correspond to one or more forces exerted on the first robot by the second robot responsive to the one or more processing operations the first robot would perform on the workpiece.

13. The method of claim 12, wherein the one or more parameters of the workpiece comprise properties of the workpiece, the properties of the workpiece comprising a material composition, a size, a weight, a density, a hardness, and/or one or more surface contours.

14. The method of claim 12, further comprising:
exerting a first force on the first robot responsive to a cutting operation; and/or
exerting a second force on the first robot responsive to a drilling operation.

15. The method of claim 14, wherein the one or more forces further comprises a static force, a dynamic force, and/or an impulse force, the method further comprising providing, by the impulse force, a short duration change in at least one of the one or more forces to simulate a momentary change in the one or more parameters of the workpiece and/or the associated processing operation.

16. The method of claim 12, further comprising:
coupling a first bearing of a test load to the first robot;
coupling a second bearing of the test load to the second robot; and
coupling a spring between the first bearing and the second bearing, wherein the spring is used to exert the one or more forces on the first robot.

17. The method of claim 16, the method further comprising:
substantially maintaining a selective distance from the first robot, by the second robot, to extend the spring and provide a selective magnitude of one or more of the forces exerted on the first robot; and
freely rotating the spring, by the test load, to maintain at least one of the one or more forces on the first robot.

18. The method of claim 16, wherein the test load is a first test load, the method further comprising:
exerting, by a second test load comprising a sleeve coupled between the first robot and the second robot, a force vector on the first robot; and
measuring, by a force sensor, the force vector.

19. The method of claim 18, further comprising adaptively programming, by a controller coupled to the second robot, a direction of travel of the second robot to maintain the force vector responsive to the measuring.

20. The method of claim 12, further comprising:
traveling, by the first robot, along a first path;
traveling, by the second robot, along a second path, wherein the second path is substantially similar to the first path; and
simulating, by the second robot, a plurality of parameters associated with a plurality of workpieces and a plurality of associated processing operations to provide one or more test conditions corresponding to each of the plurality of processing operations the first robot would perform on the plurality of workpieces to test the first robot, wherein each one of the plurality of parameters is associated with a different one of the plurality of workpieces and/or the plurality of associated processing operations.

* * * * *